US012488413B2

(12) United States Patent
Ramamonjisoa et al.

(10) Patent No.: US 12,488,413 B2
(45) Date of Patent: Dec. 2, 2025

(54) IMAGE DEPTH PREDICTION WITH WAVELET DECOMPOSITION

(71) Applicant: Niantic Spatial, Inc., San Francisco, CA (US)

(72) Inventors: MichaëL Lalaina Ramamonjisoa, Paris (FR); Michael David Firman, London (GB); James Watson, London (GB); Daniyar Turmukhambetov, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 682 days.

(21) Appl. No.: 17/749,402

(22) Filed: May 20, 2022

(65) Prior Publication Data

US 2022/0383449 A1 Dec. 1, 2022

Related U.S. Application Data

(60) Provisional application No. 63/193,005, filed on May 25, 2021.

(51) Int. Cl.
*G06T 3/40* (2024.01)
*G06N 20/00* (2019.01)
*G06T 19/00* (2011.01)

(52) U.S. Cl.
CPC .............. *G06T 3/40* (2013.01); *G06N 20/00* (2019.01); *G06T 19/006* (2013.01)

(58) Field of Classification Search
CPC ........ G06N 20/00; G06N 3/045; G06N 3/084; G06T 19/006; G06T 3/40
See application file for complete search history.

(56) References Cited

U.S. PATENT DOCUMENTS 11,100,401 B2     8/2021 Godard et al.
2011/0134999 A1*  6/2011 Han ................... H04N 19/63
                                                    375/240.18
(Continued)

FOREIGN PATENT DOCUMENTS

CN     112801889 A    5/2021
TW     201442689 A   11/2014
(Continued)

OTHER PUBLICATIONS

Luvizon, Diogo C., et al. "Adaptive multiplane image generation from a single internet picture." Proceedings of the IEEE/CVF Winter Conference on Applications of Computer Vision. 2021. (Year: 2021).*

(Continued)

*Primary Examiner* — Michael J Vanchy, Jr.
(74) *Attorney, Agent, or Firm* — Fenwick & West LLP

(57) ABSTRACT

A depth prediction model for predicting a depth map from an input image is disclosed. The depth prediction model leverages wavelet decomposition to minimize computations. The depth prediction model comprises a plurality of encoding layers, a coarse prediction layer, a plurality of decoding layers, and a plurality of inverse discrete wavelet transforms (IDWTs). The encoding layers are configured to input the image and to downsample the image into feature maps including a coarse feature map. The coarse depth prediction layer is configured to input the coarse feature map and to output a coarse depth map. The decoding layers are configured to input the feature maps and to predict wavelet coefficients based on the feature maps. The IDWTs are configured to upsample the coarse depth map based on the predicted wavelet coefficients to the final depth map at the same resolution as the input image.

19 Claims, 9 Drawing Sheets

(56) References Cited

U.S. PATENT DOCUMENTS

| | | |
|---|---|---|
| 2021/0004646 A1 | 1/2021 | Guizilini et al. |
| 2021/0049781 A1 | 2/2021 | Anisimovskiy et al. |

FOREIGN PATENT DOCUMENTS

| | | | |
|---|---|---|---|
| WO | WO-2021013334 A1 * | 1/2021 | ............ G06N 3/044 |
| WO | WO 2021/044122 A1 | 3/2021 | |

OTHER PUBLICATIONS

Luvizon, D. C. et al., "Adaptive Multiplane Image Generation from a Single Internet Picture," arXiv:2011.13317v1, 1-10, Nov. 26, 2020, pp. 1-10.

PCT International Search Report and Written Opinion, PCT Application No. PCT/IB2022/054753, Aug. 23, 2022, 11 pages.

Taiwan Intellectual Property Office, Office Action, TW Patent Application No. 111118945, Mar. 1, 2023, 16 pages.

* cited by examiner

500

---

Apply a plurality of encoding layers to generate one or more feature maps of lower resolution than an input image
510

↓

Apply a coarse depth prediction layer to predict a coarse depth map from a coarse feature map
520

↓

Apply a plurality of decoding layers to generate one or more sets of sparse wavelet coefficients
530

↓

Apply a plurality of inverse discrete wavelet transforms (IDWTs) to upsample the coarse depth map to a final depth map
540

FIG. 5

IMAGE DEPTH PREDICTION WITH WAVELET DECOMPOSITION

CROSS-REFERENCE TO RELATED APPLICATIONS

The present application claims the benefit of and priority to U.S. Provisional Application No. 63/193,005, filed on May 25, 2021, which is incorporated by reference in its entirety.

BACKGROUND

1. Technical Field

The subject matter described relates generally to predicting depth of pixels in an input image.

2. Problem

In augmented reality (AR) applications, a virtual environment is co-located with a real-world environment. If the pose of a camera capturing images of the real-world environment (e.g., a video feed) is accurately determined, virtual elements can be overlaid on the depiction of the real-world environment with precision. For example, a virtual hat may be placed on top of a real statue, a virtual character may be depicted partially behind a physical object, and the like.

To improve the AR experience, knowing the depth of pixels in the captured images informs how virtual elements would interact with real-world elements. For example, to show a virtual element moving behind or in front of a real-world object requires knowing the depth of the real-world object. Traditional manners of determining depth include utilizing detection and ranging sensors, e.g., a light detection and ranging (LIDAR) sensor. However, LIDAR sensors are expensive and not typically implemented in user devices, e.g., cellphones. Moreover, challenges arise in synchronization of the cameras and the LIDAR sensor providing the depth map. As such, there is a need for methods for high accuracy depth prediction from images.

SUMMARY

The present disclosure describes approaches to depth prediction from input images using wavelet decomposition. In various embodiments, the depth prediction model incorporates wavelet decomposition to encode the image into feature maps and iteratively refine a predicted coarse depth map (predicted from a coarse feature map) with wavelet coefficients. The depth prediction model further implements binary masking to sparsely compute wavelet coefficients by the decoding layers. The binary masks may be generated by thresholding wavelet coefficients at a lower resolution and upsampling the mask.

The depth prediction model generally comprises a plurality of encoding layers and a plurality of decoding layers. The encoding layers are configured to input the image and output feature maps at varying resolutions, wherein each encoding layer is configured to decrease resolution of the input image or the feature map produced by the previous encoding layer. The feature maps include a coarse feature map with the lowest resolution and one or more intermediate feature maps with resolutions between the input image and the coarse feature map. The decoding layers are configured to input the feature maps and output intermediate feature maps and wavelet coefficients at varying resolutions. Each decoding layer is configured to input a feature map from an encoding layer and a feature map from a previous decoding layer and to output a sparse intermediate feature map and to predict sparse wavelet coefficients. Wavelet coefficients output a depth map at a higher resolution than the wavelet coefficient by performing an inverse discrete wavelet transform to increase resolution of the depth map. The final decoding layer outputs a final depth map at full-resolution, e.g., that is the same resolution as the input image. Implementing wavelet decomposition in the depth prediction model minimizes required computations for depth prediction from an input image whilst maintaining high accuracy in the depth prediction.

Applications of the depth prediction using wavelet decomposition may include generating virtual images in augmented reality applications based on the generated depth map. Generated virtual images may interact seamlessly with objects in the real-world provided accurate depth prediction. Other applications of depth prediction using wavelet decomposition include autonomous navigation of an agent.

BRIEF DESCRIPTION OF THE DRAWINGS

FIG. 5 is a flowchart describing a process of applying a depth prediction model, in accordance with one or more embodiments.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where depth prediction from an input image is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
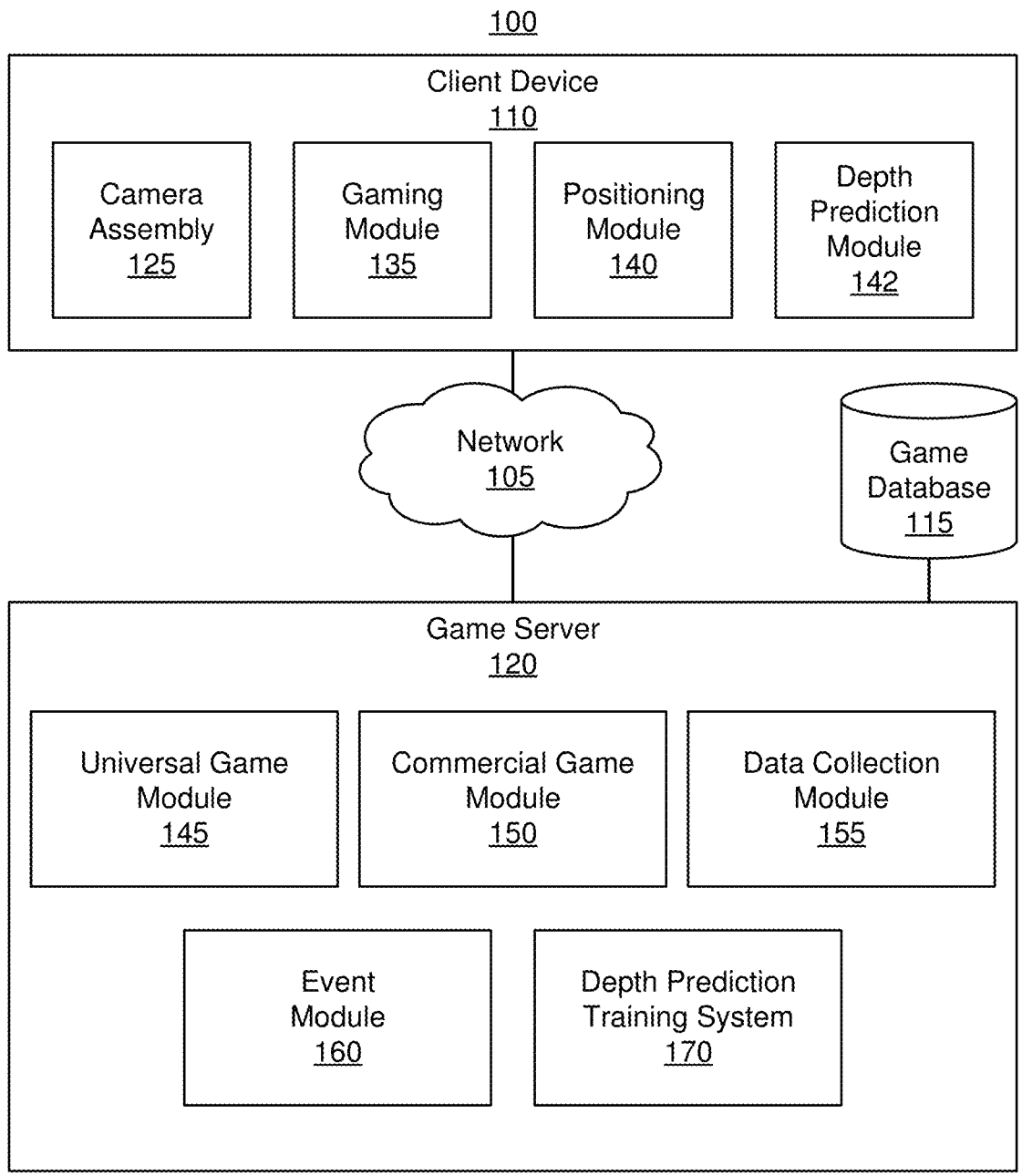
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
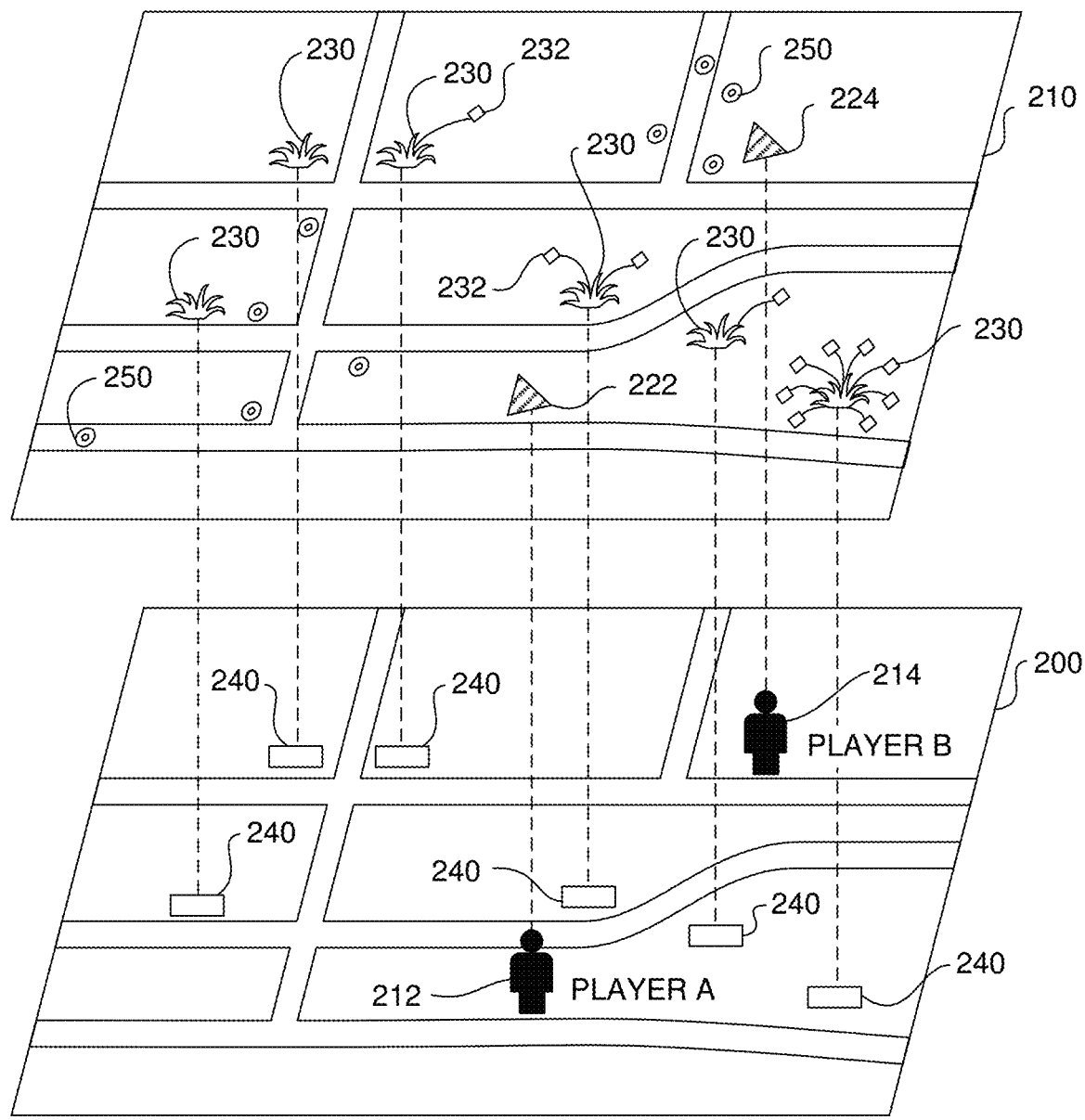
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes software components such as a gaming module 135 and a positioning module 140. The client device 110 also includes a depth prediction module 142 for predicting depth for an input image. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element, e.g., based on images captured by the camera assembly 125, and/or a depth map generated by the depth prediction module 142.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The depth prediction module 142 applies a depth prediction model to predict a depth map for an image captured by the camera assembly 125. The depth map describes the depth for pixels (e.g., each pixel) of the corresponding image. In one embodiment, the depth prediction model leverages wavelet decomposition to minimize computational costs. The depth prediction model comprises a plurality of encoding layers, a coarse depth prediction layer, a plurality of decoding layers, and a plurality of inverse discrete wavelet transforms (IDWTs) to predict the depth map for the image. The encoding layers downsample the input image into intermediate feature maps, i.e., downsampling involves decreasing resolution of input data. The coarse depth prediction layer predicts a coarse depth map from the smallest intermediate feature map. The decoding layers iteratively predict sparse wavelet coefficients. The IDWTs iteratively upsample the depth map with the predicted sparse wavelet coefficients, i.e., upsampling involves increasing resolution of input data. This process of downsampling and upsampling via wavelet-coefficient prediction can improve computing speeds by processing feature maps at varying resolutions and iteratively refining the depth map resolution through more compact prediction computations.

A depth map may be useful to other components of the client device 110. For example, the gaming module 135 may generate virtual elements for augmented reality based on the depth map. This can allow for the virtual element to interact with the environment with consideration to the depth of real-world objects in the environment. For example, a virtual character can change in size according to its placement in the environment and the depth at that placement. In embodiments where the client device 110 is associated with a vehicle, other components may generate control signals for navigating the vehicle based on the depth map. The control signals may be useful in avoiding collisions with objects in the environment.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a depth prediction training system 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The depth prediction training system 170 trains the models used by the depth prediction module 142. The depth prediction training system 170 receives image data for use in training the models of the depth prediction module 142. Generally, the depth prediction training system 170 may perform self-supervised training of the models of the depth prediction module 142. With self-supervised training, a data set used to train a particular model or models has no labels or ground truth depth. The training system 170 iteratively adjusts weights of the depth prediction module 142 to optimize for a loss.

Once the depth prediction module 142 is trained, the depth prediction module 142 receives an image and predicts a depth map for the image (or for two or more images, in additional embodiments). The depth prediction training system 170 provides the trained depth prediction module 142 to the client device 110. The client device 110 uses the trained depth prediction module 142 to predict a depth based on an input image (e.g., captured by the camera assembly on the device).

Various embodiments of depth prediction using wavelet decomposition and approaches to its training are described in greater detail in Appendices A and B, which are a part of this disclosure and specification. Note that Appendices A and B describe exemplary embodiments, and any features that may be described as or implied to be important, critical, essential, or otherwise required in the appendices should be understood to only be required in the specific embodiment described and not required in all embodiments.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
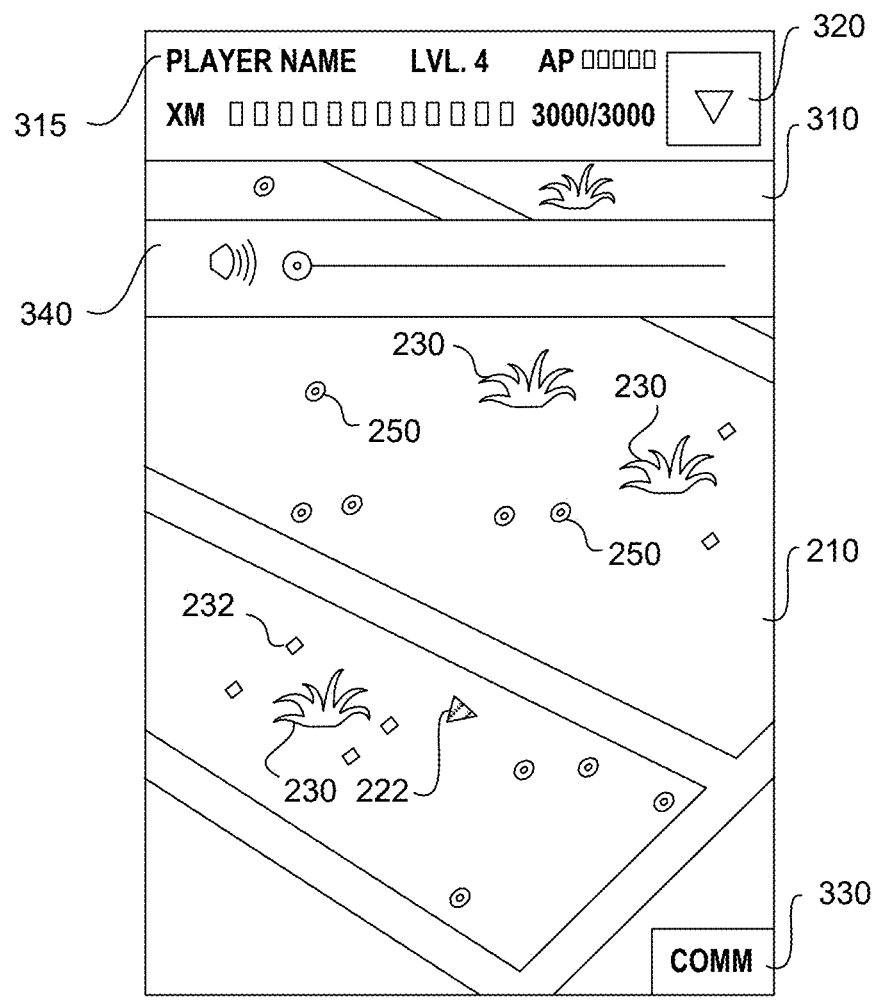
FIG. 3 depicts an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Depth Prediction Model Architecture

Figure 4A:
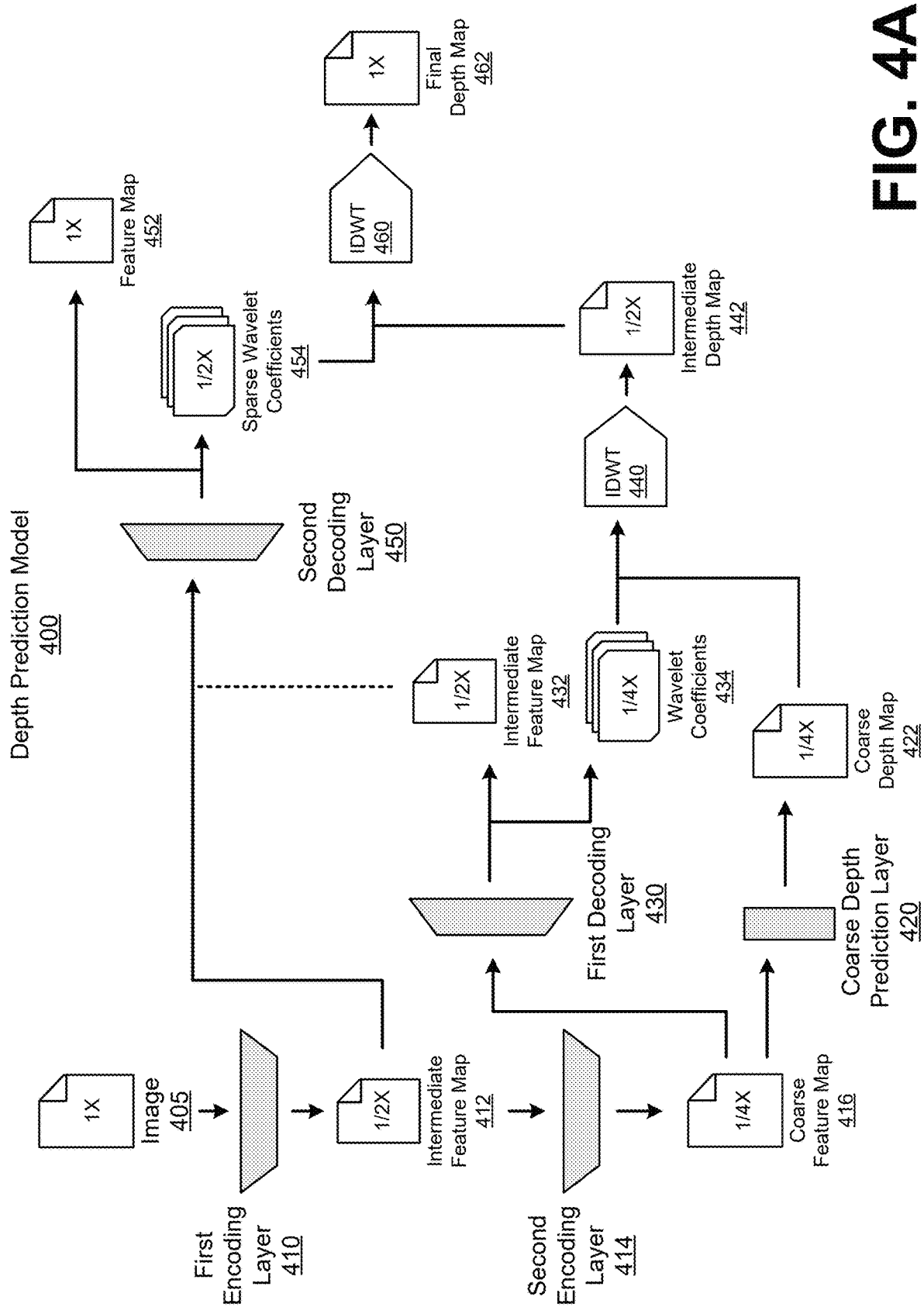
FIG. 4A is a block diagram illustrating the architecture of the depth prediction module, in accordance with one or more embodiments.

FIG. 4A is a block diagram illustrating an example architecture of a depth prediction model 400, in accordance with one or more embodiments. The depth prediction model 400 leverages wavelet decomposition in image depth prediction. In the embodiment shown, the depth prediction model 400 comprises a plurality of encoding layers, a coarse depth prediction layer, a plurality of decoding layers, and a plurality of IDWTs. For illustration, the number of encoding layers and the number of decoding layers are both set to two; however, the principles described can be applied to additional encoding layers and additional decoding layers.

The encoding layers are configured to input the image 405 and to output feature maps at decreasing resolutions. Each encoding layer may decrease the resolution of the input image by some factor, e.g., 2, 4, 8, 16, 32, etc. The encoding layers may decrease resolution at different factors from other encoding layers. For example, a first encoding layer (not necessarily the first in sequential order) may decrease the resolution according to a first factor, while a second encoding layer (not necessarily the second in sequential order) may decrease the resolution according to a second factor that is different than the first factor. The encoding layers can decrease resolution through any one of a number of compression techniques. The encoding layers may also leverage machine learning techniques, such as pooling layers, to decrease resolution. For example, the number of encoding layers may be selected from a range of 1 to 100.

A coarse depth prediction layer 420 inputs the coarse feature map 416 and predicts a coarse depth map 422. The coarse depth map 422 may be at the same resolution as the coarse feature map 416. The coarse depth prediction layer 420 may be separately trained, e.g., through supervised machine learning algorithms. For example, the coarse depth prediction layer is trained using a plurality of training images with ground truth depth maps.

The decoding layers are configured to input the features map and predict sparse wavelet coefficients. Each decoding layer is configured to predict sparse wavelet coefficients and a higher resolution feature map based on an input feature map. The sparse wavelet coefficients are utilized in conjunction with the coarse depth map to increase resolution of the coarse depth map 422 to the final depth map 462. A DWT decomposes an input signal, e.g., an image, into sparse wavelet coefficient signals according to a wavelet function. Wavelet functions include Haar wavelets, Daubechies wavelets, LeGall-Tabatai 5/3 wavelet, etc. Parameters of the wavelet function can be adjusted to target different levels of frequencies in the signal. Sparse wavelet coefficients represent frequency deconstructions of the input signal. In one or more examples, a Haar wavelet function decomposes an input signal into a low-frequency signal which may be a lower dimension of the input signal, and one or more high-frequency signals, e.g., which may capture occlusion boundaries, object outlines, etc. The decoding layers perform computations at sparse locations minimizing total required computations. The decoding layers may aim to increase resolution by some factor, e.g., 2, 4, 8, 16, 32, etc. In one or more embodiments, the decoding layers may increase resolution at different factors from other decoding layers.

Inverse discrete wavelet transforms (IDWTs) are configured to input a depth map and sparse wavelet coefficients and output a higher-resolution depth map. IDWTs are deterministic functions that are inverses of discrete wavelet transforms (DWTs). As the inverse to the DWT, the IDWT combines sparse wavelet coefficient signals into the original signal. According to one embodiment, the IDWT of Haar wavelets combines 3 high-frequency components with a low-frequency depth map, all at an initial resolution, into a depth map at a target resolution that is higher than the initial resolution.

Each decoding layer may be paired with an IDWT to increase resolution of the predicted depth maps. As noted, the IDWT inputs a depth map and sparse wavelet coefficients to output a higher-resolution depth map. The decoding layer aims to predict the sparse wavelet coefficients for the IDWT to upsample the depth map. Additional decoding layers can iteratively predict sparse wavelet coefficients at higher resolutions and additional IDWTs can iteratively scale up the resolution of the depth map to the original resolution of the image 405.

According to the example shown in FIG. 4A, there are two encoding layers each decreasing resolution by a factor of 2. The first encoding layer 410 halves the resolution of the input image 405 to generate a half-resolution feature map (½ resolution of the image 405), defined as intermediate feature map 412. The second encoding layer 414 halves the half-resolution feature map to generate a quarter-resolution feature map (¼ resolution of the image 405), identified as coarse feature map 416. The image generated by the final encoding layer is defined as the coarse feature map 416. The coarse feature map 416 is a low-resolution but high-dimensional representation of the image 405. The coarse depth prediction layer 420 inputs the coarse feature map 416 and predicts a coarse depth map 422 (¼ resolution of the image 405).

The first decoding layer 430 predicts an intermediate feature map 432 and wavelet coefficients 434 based on the coarse feature map 416. The intermediate feature map 432 (½ resolution of the image 405) is twice the resolution of the input coarse feature map 416. As shown in FIG. 4A, the intermediate depth map 432 (½ resolution of the image 405) is of the same resolution as the intermediate feature map 412 (½ resolution of the image 405); both lower in resolution than the image 405. A binary mask with pixels all on may be applied to the first decoding layer 430, resulting in the wavelet coefficients 434 being fully dense. Generation of the binary masks is further discussed in FIG. 4B. An IDWT 440 inputs the coarse depth map 422 and the wavelet coefficients 434 to determine the intermediate depth map 442 (e.g., that is twice the resolution of the coarse feature map 422, and ½ the resolution of the image 405).

The second decoding layer 450 predicts a feature map 452 and sparse wavelet coefficients 454 based on a concatenation of the intermediate feature map 412 and the intermediate feature map 432. The feature map 452 is twice the resolution as the input intermediate feature maps 412 and 432 (same resolution as the image 405). A binary mask with sparse pixels that are on may be applied to the second decoding layer 450. The binary mask is generated based on the wavelet coefficients 434, further described in FIG. 4B. An IDWT 460 inputs the intermediate depth map 442 and the sparse wavelet coefficients 454 to determine the final depth map 462 (e.g., that is twice the resolution of the intermediate depth map 442, and the same resolution as the image 405). In other embodiments, the second decoding layer 450 can input just the intermediate feature map 412 or just the intermediate feature map 432. The final decoding layer and IDWT output the final depth map 462 at the same resolution as the image 405.

Additional embodiments of the depth prediction model 400 include predicting depth from two or more images using wavelet decomposition. The images may be a stereopair captured by two cameras with known relative poses at the same time or a temporal image sequence including two or more images captured by the same camera at different times. The encoding layers can operate similarly to encode the input images into low-resolution feature maps. Additionally, the feature maps from two or more images can be used to compute a cost volume used in stereo depth estimation algorithms. The cost volume can be encoded as a feature map by an encoding layer. Decoding layer may be employed with the low-resolution or coarse feature maps and cost volume to predict a coarse depth map. The decoding layers iteratively predict sparse wavelet coefficients at varying resolutions to refine or increase resolution of the coarse depth map into the target resolution, e.g., the original resolution of the input images.

Figure 4B:
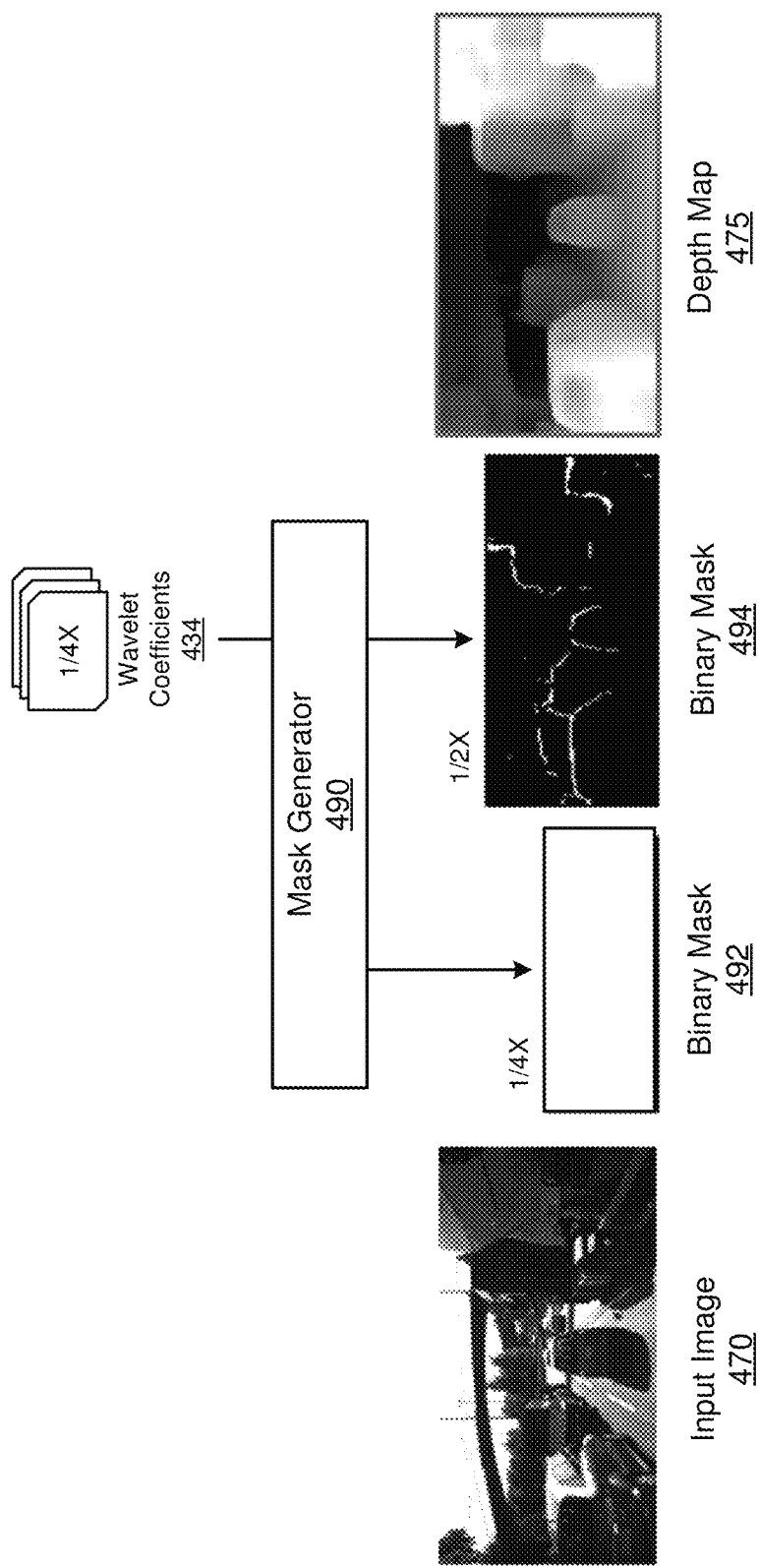
FIG. 4B illustrates an example of generating binary masks for the decoding layers to predict sparse wavelet coefficients, in accordance with one or more embodiments.

FIG. 4B illustrates an example of generating binary masks for the decoding layers to predict sparse wavelet coefficients, in accordance with one or more embodiments. The depth prediction model 400 inputs the input image 470. As described in FIG. 4A, the depth prediction model 400 applies one or more encoding layers to downsample the input image into feature maps. The decoding layers input the feature maps to predict sparse wavelet coefficients. The depth prediction model 400 generates binary masks for use in predicting sparse wavelet coefficients. The depth prediction model 400 generates some binary masks based on the predicted sparse wavelet coefficients. The binary masks decrease computations by the decoding layers when predicting sparse wavelet coefficients.

A mask generator 490 generates the binary masks. In one embodiment, the mask generator 490 initializes a binary mask 492 at ¼ resolution with all pixels on. The depth prediction model 400 applies the binary mask 492 to the coarse depth prediction layer 420 and the first decoding layer 430. As noted in FIG. 4A, the coarse depth prediction layer 420 outputs the coarse depth map 422, and the first decoding layer 430 outputs the wavelet coefficients 434 and the intermediate feature map 432. The wavelet coefficients 434 can be fully dense given the binary mask 492 is all on.

To generate subsequent binary masks for subsequent decoding layers, the mask generator 490 inputs sparse wavelet coefficients at a first lower resolution to generate a binary mask for the subsequent decoding layer that predicts sparse wavelet coefficients at a second upsampled resolution. The mask generator 490 performs thresholding and upsampling on the wavelet coefficients 434 to create the binary mask 494. The thresholding utilizes a wavelet value threshold to determine whether a pixel of the binary mask is on or off. A pixel that is on in the binary mask retains that pixel from decoding computation, and a pixel that is off in the binary mask removes that pixel from decoding computation. The wavelet value threshold can be applied to the set of wavelet coefficients in the aggregate. For example, the mask generator 490 can evaluate whether at least one wavelet coefficient has a value above the wavelet value threshold on a per-pixel basis. In another example, the mask generator 490 can calculate an average of the wavelet coefficients and evaluate whether the average is above the wavelet value threshold on a per-pixel basis. The mask generator 490 upsamples the binary mask 494 to be at ½ resolution.

The depth prediction model 400 applies the binary mask 494 to the second decoding layer 450, such that the second decoding layer 450 only predicts, from the input feature maps, sparse wavelet coefficients 454 for pixels that are on in the binary mask 494. In embodiments with additional decoding layers, the mask generator 490 creates an additional binary mask by inputting the sparse wavelet coefficients from the lower resolution to generate the binary mask for the additional decoding layer.

Notably, at each decoding stage, the binary mask encompasses fewer and fewer of pixels to minimize redundant computations, while refining wavelet predictions at edge boundaries. The wavelet value threshold is adjustable to tradeoff computational cost and accuracy. The lowest wavelet value threshold sacrifices the least amount of accuracy for incremental benefit in computational savings. The highest wavelet value threshold sacrifices the most accuracy for significant computation savings.

Example Methods

FIG. 5 is a flowchart describing a process 500 of applying a depth prediction model, in accordance with one or more embodiments. The process 500 may be folded into other processes, e.g., training of the depth prediction model, and/or utilizing the trained depth prediction model to predict a depth map. The steps of the process 500 are described as performed by the depth prediction model. One of ordinary skill would understand other computer processors may be used to execute the steps of the process 500.

The depth prediction model applies a plurality of encoding layers to generate one or more feature maps of lower resolution than an input image. Each encoding layer inputs the image or feature map at a first resolution and outputs a second feature map at a second resolution that is lower than the first resolution. The encoding layers may decrease the resolution by a factor, e.g., 2, 4, 8, 16, 32, etc. Each encoding layer may utilize a fixed deterministic downsampling function. In other embodiments, each encoding layer may be trained.

The depth prediction model applies a coarse depth prediction layer to predict a coarse depth map from a coarse feature map. The lowest resolution feature map output by the encoding layers is defined as the coarse feature map. The coarse prediction layer inputs the coarse feature map and outputs the coarse depth map. A depth map indicates a depth of any object at each pixel in a corresponding image of an environment. The coarse depth map may be of the same resolution as the coarse feature map, such that there is a one-to-one pixel correlation. Each pixel of the coarse depth map indicates a depth of an object located at the same pixel location as the coarse feature map.

The depth prediction model applies a plurality of decoding layers to generate one or more sets of sparse wavelet coefficients. Each decoding layer inputs one or more feature maps and outputs a predicted set of sparse wavelet coefficients. In some embodiments, the input feature maps and the predicted set of sparse wavelet coefficients are of the same resolution. For example, a decoding layer inputs feature maps at ½× the original image resolution and outputs the predicted set of sparse wavelet coefficients at ½× the original image resolution. The predicted set of sparse wavelet coefficients may comprise one or more sparse wavelet coefficients. Each sparse wavelet coefficient is a map of values according to that sparse wavelet coefficient. Each decoding layer may also output a predicted upsampled feature map from the input feature map. Each decoding layer may also concatenate and input the feature map generated by an encoding layer and the feature map predicted by the prior decoding layer. In some embodiments, the depth prediction model applies a binary mask to a decoding layer to predict the sparse wavelet coefficients. The depth prediction model may generate a binary mask by thresholding wavelet coefficients at a lower resolution (e.g., predicted by the antecedent decoding layer) and upsampling the binary mask to the higher resolution. The first binary mask applied to the coarse depth prediction layer and the first decoding layer is initialized to be all on.

The depth prediction model applies a plurality of inverse discrete wavelet transforms (IDWTs) to upsample the coarse depth map into the final depth map. An IDWT inputs a depth map and predicted sparse wavelet coefficients at a first resolution and outputs an upsampled depth map at a second resolution that is higher than the first resolution. The IDWT may be a deterministic function. The IDWT's work in sequence with the decoding layers. The final IDWT outputs a final depth map at the same resolution as the input training image.

Figure 6:
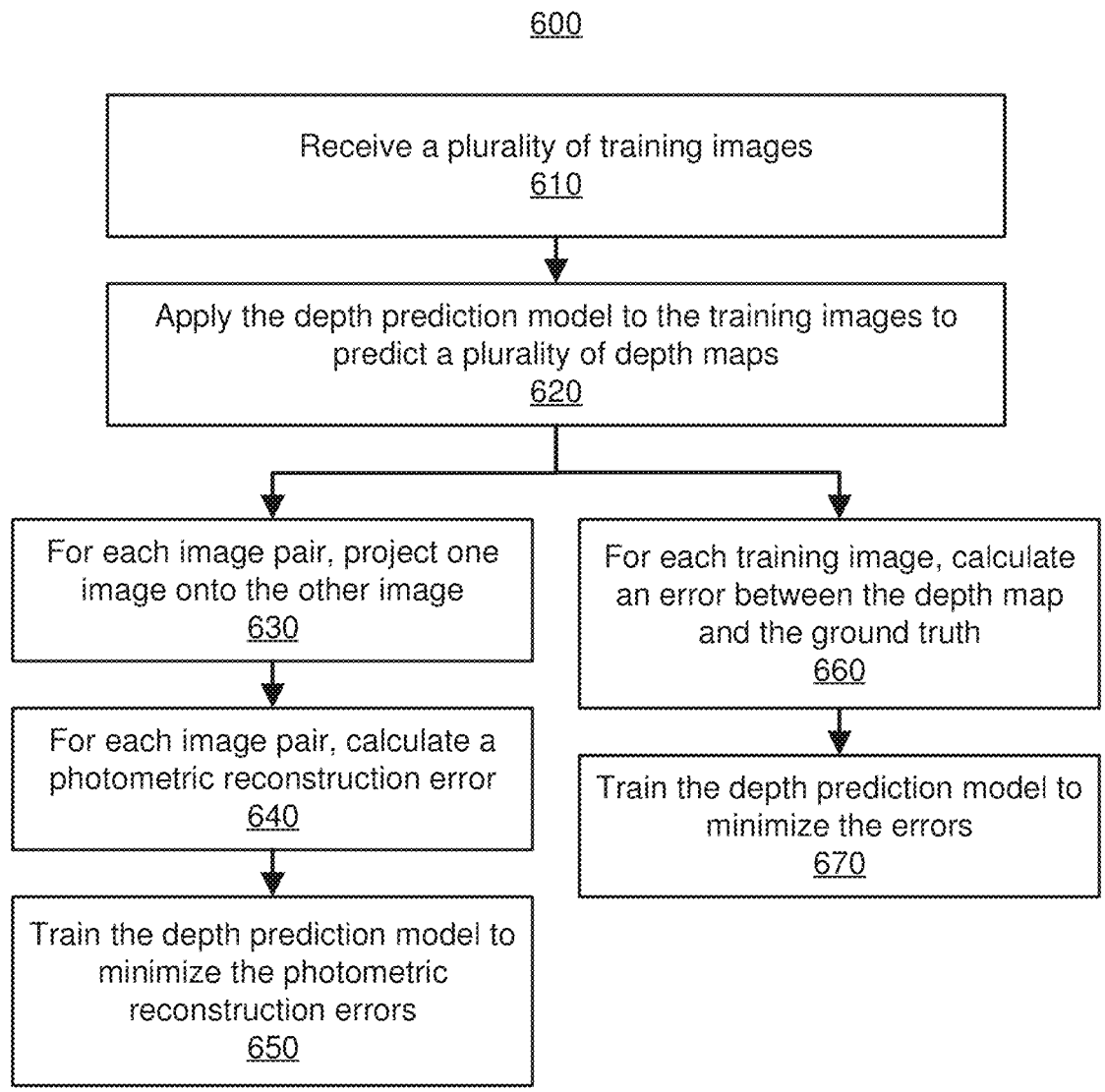
FIG. 6 is a flowchart describing a process of training the depth prediction model, in accordance with one or more embodiments.

FIG. 6 is a flowchart describing a process 600 of training the depth prediction model, in accordance with one or more embodiments. The depth prediction training system 170 may perform some or all steps of the process 600. In other embodiments, other computer systems may perform some or all steps of the process 600, e.g., in isolation of the depth prediction training system 170 or in conjunction with the depth prediction training system 170.

The depth prediction training system 170 receives 610 a plurality of training images for use in training the depth prediction model. In one or more embodiments (further described in steps 630-650), the depth prediction training system 170 trains the depth prediction model in an unsupervised projection manner between image pairs. Projection from one image to another is based on a depth map of the image being projected. The image pairs may be stereoscopic image pairs or pseudostereoscopic image pairs. A stereoscopic image pair is a pair of two images that are taken by two cameras contemporaneously. The pose between the two cameras may be fixed and known by the depth prediction training system 170. In other embodiments, pose is estimated, e.g., using position sensors, accelerometers, gyroscopes, a pose estimation model, other pose estimation techniques, etc. Pose estimation modeling is further described in U.S. application Ser. No. 16/332,343 filed on Sep. 12, 2017, which is incorporated by reference in its entirety. A pseudostereoscopic image pair is a pair of two images taken from video captured by a single camera. The pose between the two images is generally unknown and may be determined, e.g., using position sensors, accelerometers, gyroscopes, a pose estimation model, other pose estimation techniques, etc.

In other embodiments (further described in steps 660-670), the depth prediction training system 170 trains the depth prediction model in a supervised manner. According to supervised training, each image has a corresponding ground truth depth map. The depth map may be detected with a physical sensor, e.g., a detection and ranging sensor like LIDAR.

The depth prediction training system 170 applies 620 the depth prediction model to the training images to predict a plurality of depth maps. The depth prediction training system 170 performs the process 500 for determining a depth map for a training image.

At this juncture, the depth prediction training system 170 may train the depth prediction model via unsupervised training using image pairs. The depth prediction training system 170, for each image pair, projects 630 one image onto the other image. The depth prediction training system 170 projects from the first image onto the second image based in part on a pose between the first image and the second image and the predicted depth map for the first image, via the depth prediction model. In a true stereoscopic image pair, the depth prediction training system 170 projects from a left image onto a right image, and/or vice versa. In a pseudostereoscopic image pair, the depth prediction training system 170 projects from one image onto another image, and/or vice versa, also based on an estimated pose between the two images and the depth map predicted by the depth prediction model.

The depth prediction training system 170, for each image pair, calculates 640 a photometric reconstruction error. In general, the projection is compared against the target image. Error may be calculated on a per-pixel basis, such that the depth prediction training system 170 may train the depth prediction model to particularly minimize the per-pixel error.

The depth prediction training system 170 trains 650 the depth prediction model to minimize the photometric reconstruction error. In general, to train the depth prediction model, the depth prediction training system 170 backpropagates the error through the depth prediction model to adjust parameters of the depth prediction model to minimize the errors. The depth prediction training system 170 may utilize batch training over various epochs. Training may also include cross-validation between batches. Training is complete when certain metrics have been achieved. Example metrics include achieving some threshold accuracy, precision, other statistical measures, etc.

In the alternative to unsupervised training, the depth prediction training system 170 may perform supervised training using ground truth depth maps. The depth prediction training system 170, for each training image, calculates 660 an error between a predicted depth map and the ground truth depth map. The error may be calculated as a per-pixel difference.

The depth prediction training system 170 trains 670 the depth prediction model to minimize the errors. The depth prediction training system 170 also backpropagates the error through the depth prediction model to adjust parameters of the depth prediction model to minimize the errors. The depth prediction training system 170 may utilize batch training over various epochs. Training may also include cross-validation between batches. Training is complete when certain metrics have been achieved.

In one or more embodiments, the depth prediction training system 170 trains the depth prediction model end-to-end. In an end-to-end training scheme, the depth prediction training system 170 backpropagates and adjusts all parameters of the various layers of the depth prediction model (e.g., the encoding layers, the decoding layers, the coarse depth prediction layer, or some combination thereof) to minimize the errors.

In other embodiments, the depth prediction training system 170 may isolate training of various layers of the depth prediction model. For example, the depth prediction training system 170 may, in a first stage, train a first iteration of the depth prediction model comprising one encoding layer, the coarse prediction layer, and one decoding layer. Upon sufficient training of the first encoding layer and the first decoding layer, the depth prediction training system 170 may expand the architecture of the depth prediction model to include a second encoding layer and a second decoding layer (e.g., as envisioned in FIG. 4A). The depth prediction training system 170 may fix the parameters of the first encoding layer and the first decoding layer. Then, in a second stage of training, the depth prediction training system 170 may train the second encoding layer and the second decoding layer (and optionally also the coarse prediction layer). The depth prediction training system 170 may perform additional iterations of expanding the architecture, fixing the previously trained layers, then focusing training on the deeper layers.

In other embodiments, the depth prediction training system 170 may also separately train coarse depth prediction layer. In such embodiments, the depth prediction training system 170 may curate the training data to accommodate training the coarse depth prediction layer. For example, the depth prediction training system 170 may take training images with ground truth depth maps and downsample the training images and the ground truth depth maps. With the downsampled training images and the downsampled ground truth depth maps, the depth prediction training system 170 may train the coarse prediction layer in a supervised manner.

Figure 7:
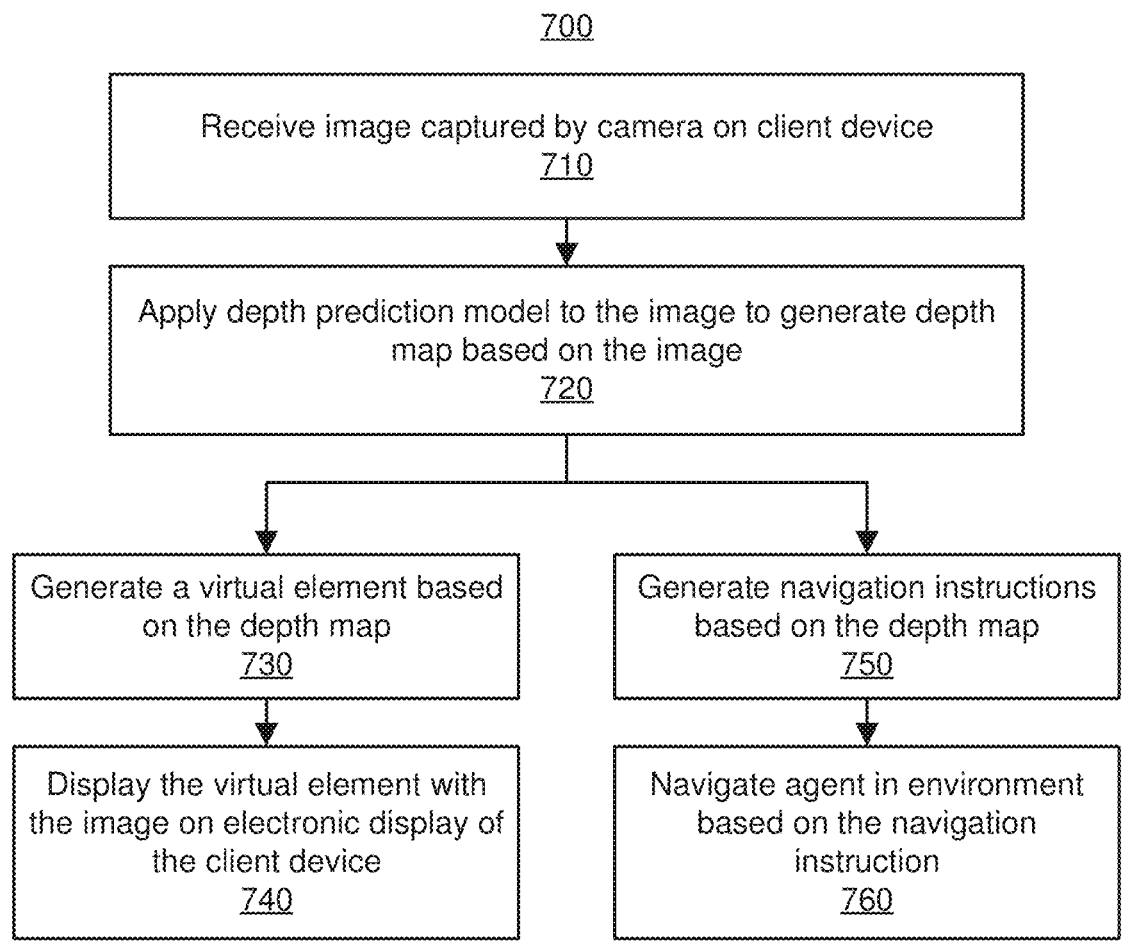
FIG. 7 is a flowchart describing a process of utilizing the depth map predicted by the depth prediction model, in accordance with one or more embodiments.

FIG. 7 is a flowchart describing a process 700 of utilizing the depth map predicted by the depth prediction model, in accordance with one or more embodiments. The process 700 yields a depth map describing depth at each pixel of an input image. Some of the steps of FIG. 7 are illustrated from the perspective of a client device. However, some or all of the steps may be performed by other entities and/or specific components of the client device. In addition, some embodiments may perform the steps in parallel, perform the steps in different orders, or perform different steps. Other components may utilize the predicted depth map for virtual content generation or navigational control of an agent in an environment.

The client device receives 710 an image captured by a camera on the client device, e.g., the camera assembly 125. The image may be a color image or monochrome. The camera may have known camera intrinsic parameters, e.g., focal length, sensor size, principal point, etc.

The client device applies 720 the depth prediction model to the image to generate a depth map based on the image. Application of the depth prediction model is an embodiment of the process 500 described in FIG. 5. The depth prediction model may be trained according to the process 600 described in FIG. 6, having an architecture as described in FIG. 4A. The depth map is of the same resolution as the image captured. The depth map has a depth value for each pixel corresponding to depth of an object at the pixel location in the image.

In one or more embodiments, the client device generates 730 a virtual element based on the depth map. The client device may be an embodiment of the client device 110 as part of an augmented reality game. The client device may include an electronic display configured to stream a live feed being captured by the camera as part of the augmented reality game. The client device incorporates virtual elements overlaid onto the live feed captured by the camera, thereby displaying augmented reality content. The client device generates the one or more virtual elements based on the depth map predicted by the depth prediction model. One virtual element may be an in-game item that can be accessed by the player. The client device may tailor visual characteristics of the virtual element based on the depth map. For example, the size of a virtual object is scaled based on placement of the object at different depths in the environment. In another example, the virtual element may be a virtual character that can move around the environment informed by the depth map.

In other embodiments, the client device may generate 750 navigation instructions based on the depth map for navigating an agent in the environment. In such embodiments, the client device may be a computing system on an autonomous agent. The navigation instructions may be based in part on the predicted depth map. Other data may also be used in generating the navigation instructions, e.g., object tracking, object detection and classification, etc.

The client device 760 may proceed with navigating 760 the agent in the environment based on the navigation instructions. The navigation instructions may include multiple sets of instructions for navigating the agent. For example, one set of instructions can control acceleration, another set can control braking, and another set can control steering, etc.

Example Computing System

Figure 8:
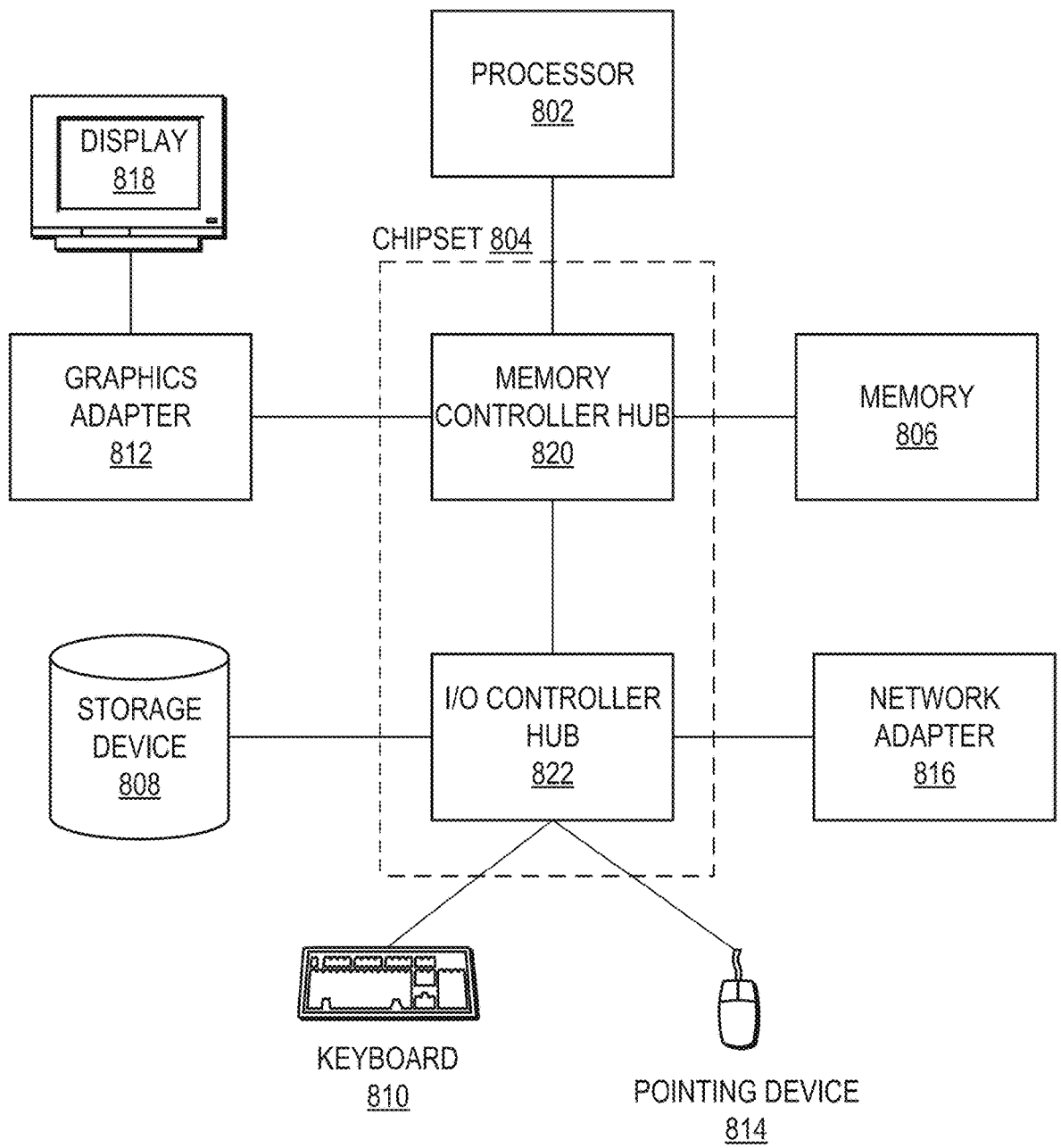
FIG. 8 illustrates an example computer system suitable for use in training or applying a depth prediction model, according to one or more embodiments.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random-access memory, such as DRAM, SRAM, DDR RAM, ROM, EEPROM, flash memory.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A method comprising:
    receiving an image captured by a camera on a client device;
    applying a depth prediction model to the image to generate a depth map based on the image, the depth prediction model comprising:
        a plurality of encoding layers configured to input the image and to downsample the image into one or more feature maps including a coarse feature map,
        a coarse depth prediction layer configured to input the coarse feature map and to output a coarse depth map based on the coarse feature map,
        a plurality of decoding layers configured to input the one or more feature maps and to predict wavelet coefficients based on the one or more feature maps, wherein:
            a first decoding layer of the plurality is configured to:
                input the coarse feature map at a first resolution, predict wavelet coefficients at the first resolution, and output a first feature map at a second resolution that is higher than the first resolution; and
            a second decoding layer of the plurality is configured to:
                input the first feature map at the second resolution that is output by the first decoding layer,
                predict sparse wavelet coefficients at the second resolution, and
                output a second feature map at a third resolution that is higher than the second resolution; and
        a plurality of inverse discrete wavelet transforms configured to upsample the
            coarse depth map based on the predicted wavelet coefficients;
    generating a virtual element based on the depth map; and
    displaying the virtual element with the image on an electronic display of the client device.

2. The method of claim 1, wherein each encoding layer is configured to downsample by a common factor, and each decoding layer is configured to upsample by the common factor.

3. The method of claim 1, wherein a first encoding layer is configured to downsample by a first factor, and a second encoding layer is configured to downsample by a second factor that is different than the first factor.

4. The method of claim 1, wherein each decoding layer is configured to predict at least one of: Haar wavelet coefficients, Daubechies wavelet coefficients, and LeGall-Tabatai 5/3 wavelet coefficients.

5. The method of claim 1, wherein the second decoding layer is further configured to:
    concatenate the first feature map at the second resolution with a third feature map at the
        second resolution that is output by one of the encoding layers, and input the first feature map concatenated with the third feature map.

6. The method of claim 1, wherein the second decoding layer is configured to predict the sparse wavelet coefficients by applying a binary mask that is generated based on the wavelet coefficients at the first resolution.

7. The method of claim 1, wherein a number of encoding layers is equal to a number of decoding layers.

8. The method of claim 1, wherein the depth map has the same resolution as the image.

9. The method of claim 1, wherein the depth prediction model is a machine-learned model trained using a plurality of training images with ground truth depth maps.

10. A non-transitory computer-readable storage medium storing instructions that, when executed by a processor, cause the processor to perform operations comprising:
    receiving an image captured by a camera on a client device;
    applying a depth prediction model to the image to generate a depth map based on the image, the depth prediction model comprising:
        a plurality of encoding layers configured to input the image and to downsample the image into one or more feature maps including a coarse feature map,
        a coarse depth prediction layer configured to input the coarse feature map and to output a coarse depth map based on the coarse feature map,
        a plurality of decoding layers configured to input the one or more feature maps and to predict wavelet coefficients based on the one or more feature maps, wherein:
            a first decoding layer of the plurality is configured to:
                input the coarse feature map at a first resolution, predict wavelet coefficients at the first resolution, and output a first feature map at a second resolution that is higher than the first resolution; and
            a second decoding layer of the plurality is configured to:
                input the first feature map at the second resolution that is output by the first decoding layer,
                predict sparse wavelet coefficients at the second resolution, and
                output a second feature map at a third resolution that is higher than the second resolution; and
        a plurality of inverse discrete wavelet transforms configured to upsample the coarse depth map based on the predicted wavelet coefficients;
    generating a virtual element based on the depth map; and
    displaying the virtual element with the image on an electronic display of the client device.

11. The non-transitory computer-readable storage medium of claim 10, wherein each encoding layer is configured to downsample by a common factor, and each decoding layer is configured to upsample by the common factor.

12. The non-transitory computer-readable storage medium of claim 10, wherein a first encoding layer is configured to downsample by a first factor, and a second encoding layer is configured to downsample by a second factor that is different than the first factor.

13. The non-transitory computer-readable storage medium of claim 10, wherein each decoding layer is configured to predict at least one of: Haar wavelet coefficients, Daubechies wavelet coefficients, and LeGall-Tabatai 5/3 wavelet coefficients.

14. The non-transitory computer-readable storage medium of claim 10, wherein the second decoding layer is further configured to:
concatenate the first feature map at the second resolution with a third feature map at the second resolution that is output by one of the encoding layers, and
input the first feature map concatenated with the third feature map.

15. The non-transitory computer-readable storage medium of claim 10, wherein the second decoding layer is configured to predict the sparse wavelet coefficients by applying a binary mask that is generated based on the wavelet coefficients at the first resolution.

16. The non-transitory computer-readable storage medium of claim 10, wherein a number of encoding layers is equal to a number of decoding layers.

17. The non-transitory computer-readable storage medium of claim 10, wherein the depth map has the same resolution as the image.

18. The non-transitory computer-readable storage medium of claim 10, wherein the depth prediction model is a machine-learned model trained using a plurality of training images with ground truth depth maps.

19. A method comprising:
receiving an image captured by a camera on an autonomous agent;
applying a depth prediction model to the image to generate a depth map based on the image, the depth prediction model comprising:
a plurality of encoding layers configured to input the image and to downsample the image into one or more feature maps including a coarse feature map,
a coarse depth prediction layer configured to input the coarse feature map and to output a coarse depth map based on the coarse feature map,
a plurality of decoding layers configured to input the one or more feature maps and to predict wavelet coefficients based on the one or more feature maps, wherein:
a first decoding layer of the plurality is configured to:
input the coarse feature map at a first resolution, predict wavelet coefficients at the first resolution, and output a first feature map at a second resolution that is higher than the first resolution; and
a second decoding layer of the plurality is configured to:
input the first feature map at the second resolution that is output by the first decoding layer,
predict sparse wavelet coefficients at the second resolution, and
output a second feature map at a third resolution that is higher than the second resolution; and
a plurality of inverse discrete wavelet transforms configured to upsample the coarse depth map based on the predicted wavelet coefficients;
generating navigation instructions based on the depth map; and
navigating the autonomous agent based on the navigation instructions.

* * * * *